United States Patent
Osgood et al.

(10) Patent No.: US 11,486,259 B1
(45) Date of Patent: Nov. 1, 2022

(54) COMPONENT WITH COOLING PASSAGE FOR A TURBINE ENGINE

(71) Applicant: GENERAL ELECTRIC COMPANY, Schenectady, NY (US)

(72) Inventors: Daniel Endecott Osgood, Loveland, OH (US); Kirk Douglas Gallier, Cincinnati, OH (US); Zachary Daniel Webster, Mason, OH (US); Gregory Terrence Garay, West Chester, OH (US); Nicholas William Rathay, Rock City Falls, NY (US); Daniel Lee Durstock, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/519,958

(22) Filed: Nov. 5, 2021

(51) Int. Cl.
 *F01D 5/18* (2006.01)
(52) U.S. Cl.
 CPC ........ *F01D 5/187* (2013.01); *F05D 2260/201* (2013.01); *F05D 2260/202* (2013.01)
(58) Field of Classification Search
 CPC .............. F01D 5/187; F05D 2260/201; F05D 2260/202
 See application file for complete search history.

(56) References Cited

U.S. PATENT DOCUMENTS

| | | | |
|---|---|---|---|
| 5,291,654 A | 3/1994 | Judd et al. | |
| 5,405,242 A | 4/1995 | Auxier et al. | |
| 6,254,334 B1 | 7/2001 | LaFleur | |
| 8,057,182 B2 | 11/2011 | Brittingham et al. | |
| 8,152,467 B2 | 4/2012 | Guemmer | |
| 8,177,506 B2 | 5/2012 | Cunha et al. | |
| 10,100,646 B2 * | 10/2018 | Propheter-Hinckley | B22C 9/10 |
| 10,294,798 B2 | 5/2019 | Propheter-Hinckley et al. | |
| 10,612,391 B2 | 4/2020 | Rathay et al. | |
| 10,975,704 B2 | 4/2021 | Webster et al. | |
| 2016/0273363 A1 | 9/2016 | Bunker et al. | |
| 2017/0030198 A1 | 2/2017 | Kruckels et al. | |
| 2017/0298823 A1 * | 10/2017 | Harding | F23R 3/005 |
| 2019/0211685 A1 | 7/2019 | Rathay et al. | |

FOREIGN PATENT DOCUMENTS

| | | |
|---|---|---|
| EP | 3124745 B1 | 3/2018 |
| WO | 1999014465 A1 | 3/1999 |

* cited by examiner

*Primary Examiner* — Eldon T Brockman
(74) *Attorney, Agent, or Firm* — McGarry Bair PC

(57) ABSTRACT

An engine component for a turbine engine comprising a wall defining an interior and having an outer surface over which flows the combustion airflow. The outer surface defining a first side and a second side extending between an upstream edge and a downstream edge and extending between a root and a tip. At least one cooling conduit provided in the interior and having conduit sidewalls; a set of cooling passages with at least one of the cooling passages in the set comprising: a first cooling passage portion having a surface outlet opening on the surface; a second cooling passage portion, intersecting the first cooling passage portion, and having an inlet fluidly coupled to the cooling conduit and an intermediate outlet fluidly connecting the second cooling passage portion to the first cooling passage at the intersection. The cooling passage comprising at least one fillet.

20 Claims, 13 Drawing Sheets

COMPONENT WITH COOLING PASSAGE FOR A TURBINE ENGINE

TECHNICAL FIELD

The disclosure generally relates to a cooling passage for an engine, and more specifically to a set of cooling passages for cooling a trailing edge of an airfoil.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is at a high temperature, it is cooler relative to the turbine air, and can be used to cool the turbine.

Contemporary turbine blades and other engine components generally include one or more interior cooling circuits for routing the cooling air through the engine component to cool different portions of the engine component, and can include dedicated cooling circuits for cooling different portions of the engine component.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
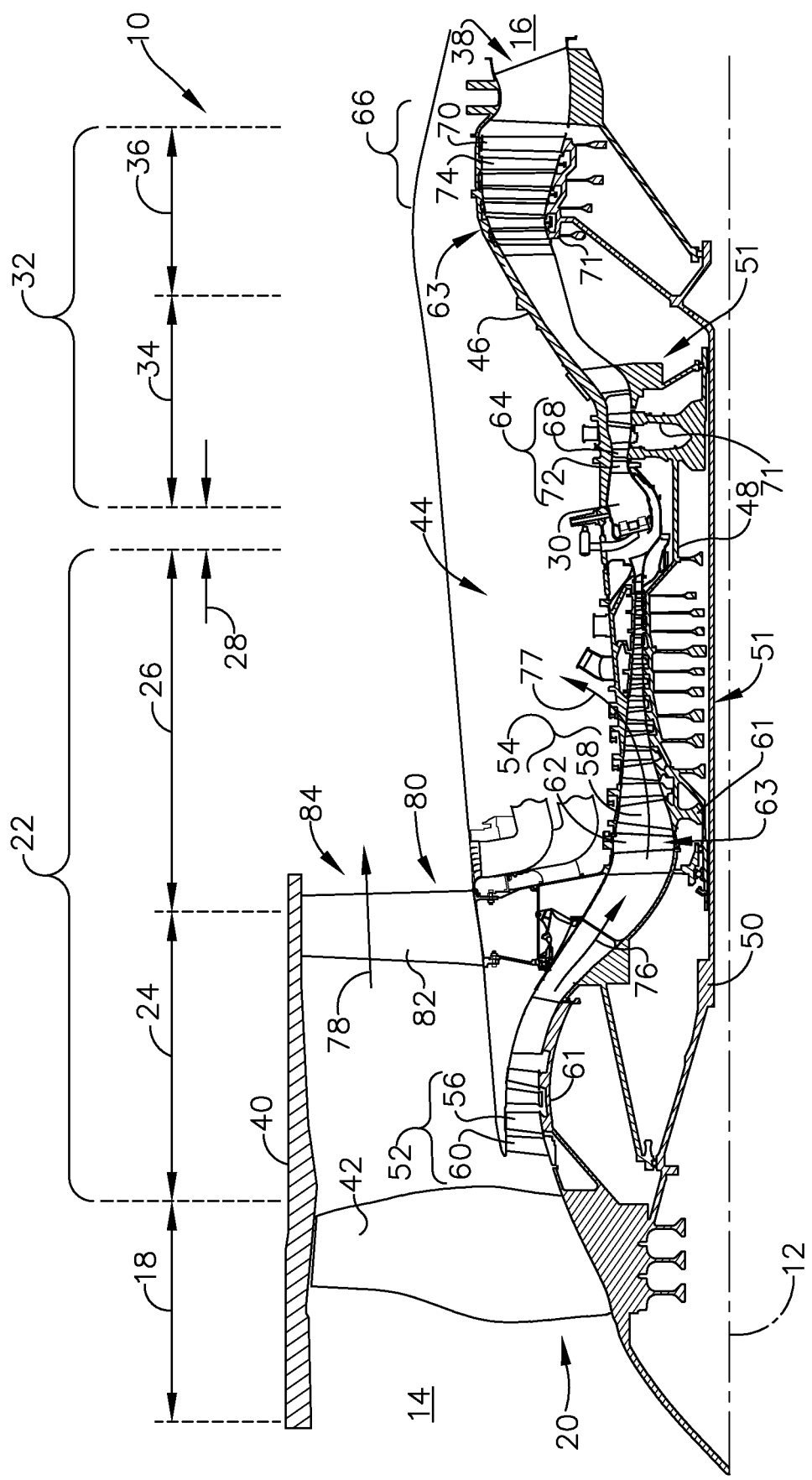
FIG. 1 is a schematic, cross-sectional diagram of a gas turbine engine for an aircraft.

Aspects of the disclosure described herein are directed to a cooling hole provided in an engine component. More specifically, the disclosure is directed toward one or more cooling holes provided in an airfoil proximate a trailing edge of the airfoil. For purposes of illustration, the present disclosure will be described with respect to the turbine blade for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The engine core 44 is surrounded by a core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The rotating compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static compressor vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30.

A remaining portion of an airflow 78 bypasses the LP compressor 24 and engine core 44 and exits the engine assembly 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
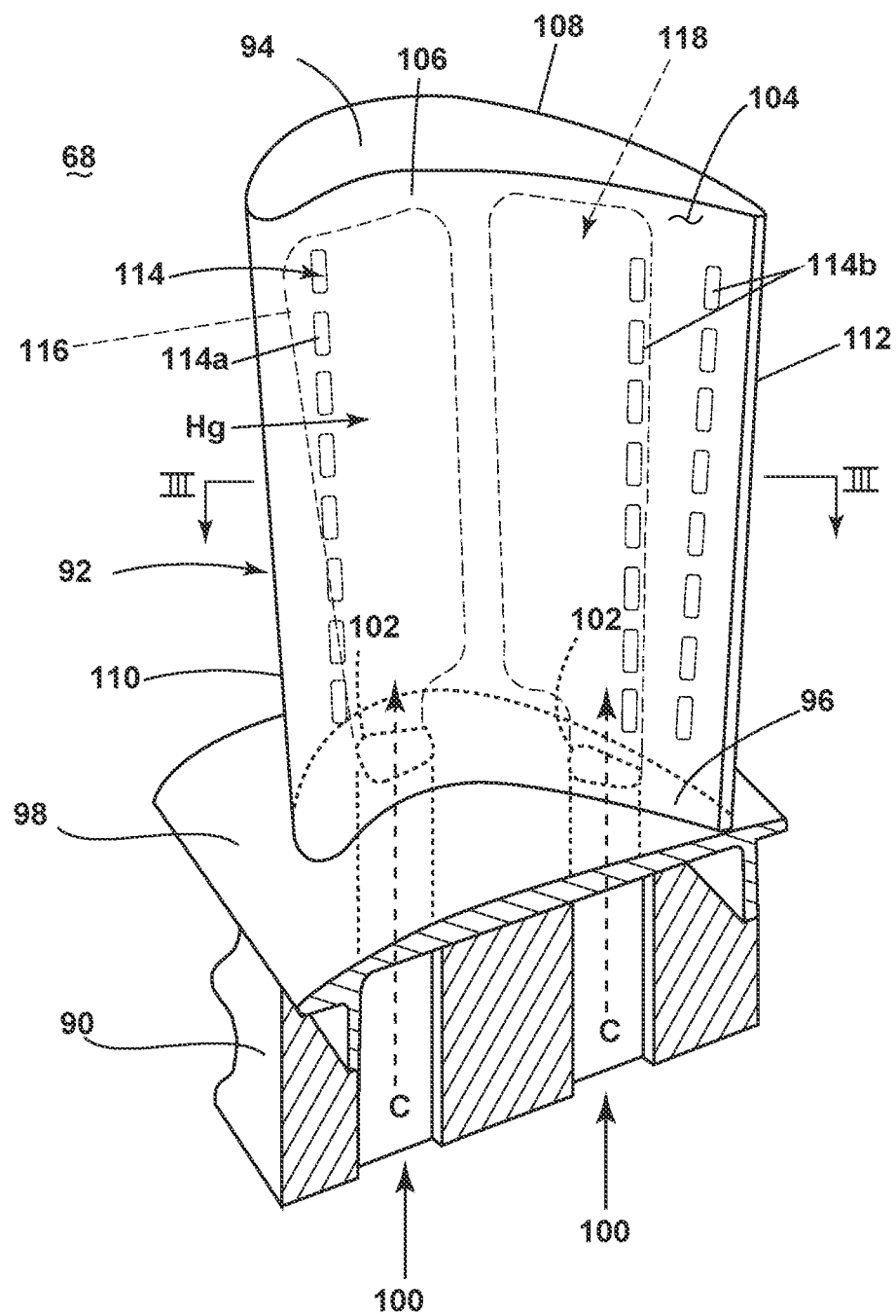
FIG. 2 is a perspective view of an airfoil of the engine of FIG. 1 in the form of a blade including a set of cooling passages.

Referring now to FIG. 2, an engine component in the form of one of the turbine blades 68 of the engine 10 from FIG. 1 is shown. Alternatively, the engine component can be a vane, a strut, a service tube, a shroud, or a combustion liner in non-limiting examples, or any other engine component that can require or utilize cooling passages. The turbine blade 68 includes a dovetail 90 and an airfoil 92. The dovetail 90 further includes at least one inlet passage 100, shown as a two exemplary inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90. The dovetail 90 can be configured to mount to a turbine rotor disk 71 on the engine 10 of FIG. 1, for example.

The airfoil 92 extends radially between a tip 94 and a root 96 defining a span-wise direction therebetween. The airfoil 92 mounts to the dovetail 90 at a platform 98 at the root 96. The platform 98 helps to radially contain the turbine engine mainstream airflow. Additionally, the airfoil 92 includes an outer wall 104 including a first side 106 and a second side 108, and extending between an upstream edge 110 and a downstream edge 112 to define a streamwise direction therebetween. It should be understood that the upstream edge 110 can be a leading edge of the airfoil 92 and the downstream edge 112 can be a trailing edge of the airfoil 92. Further, the first side 106 can be a pressure side and the second side 108 can be a suction side of a turning vane as illustrated. It is also further contemplated that the airfoil 92 can be a non-turning vane, by way of non-limiting example a frame fairing. It is also further contemplated that neither the first or second sides 106, 108 are curved to form a pressure side and/or suction side. The outer wall 104 can partially define and surround at least one cooling conduit 116, shown as two exemplary cooling conduits 116 forming a cooling circuit 118.

A set of cooling passages 114 can exhaust on the first side 106. The set of cooling passages 114 can be two sets of cooling passages a first set 114a located adjacent the upstream edge 110 and a second set 114b located adjacent the downstream edge 112. Further, the set of cooling passages 114 can be arranged in a span-wise row. Optionally, another set of cooling passage can be provided on the second side 108, but is obscured by the perspective of FIG. 2.

In operation, a hot gas flow ($H_g$), such as a combustor flow, can pass along the exterior of the outer wall 104 of the airfoil 92. A cooling fluid flow (C) can be provided to the inlet passages 100 and into the airfoil 92 at the passage outlets 102, passing into the cooling conduits 116. The cooling fluid flow (C) can be provided throughout the airfoil 92 and exhausted from the set of cooling passages 114 as a cooling film.

Figure 3:
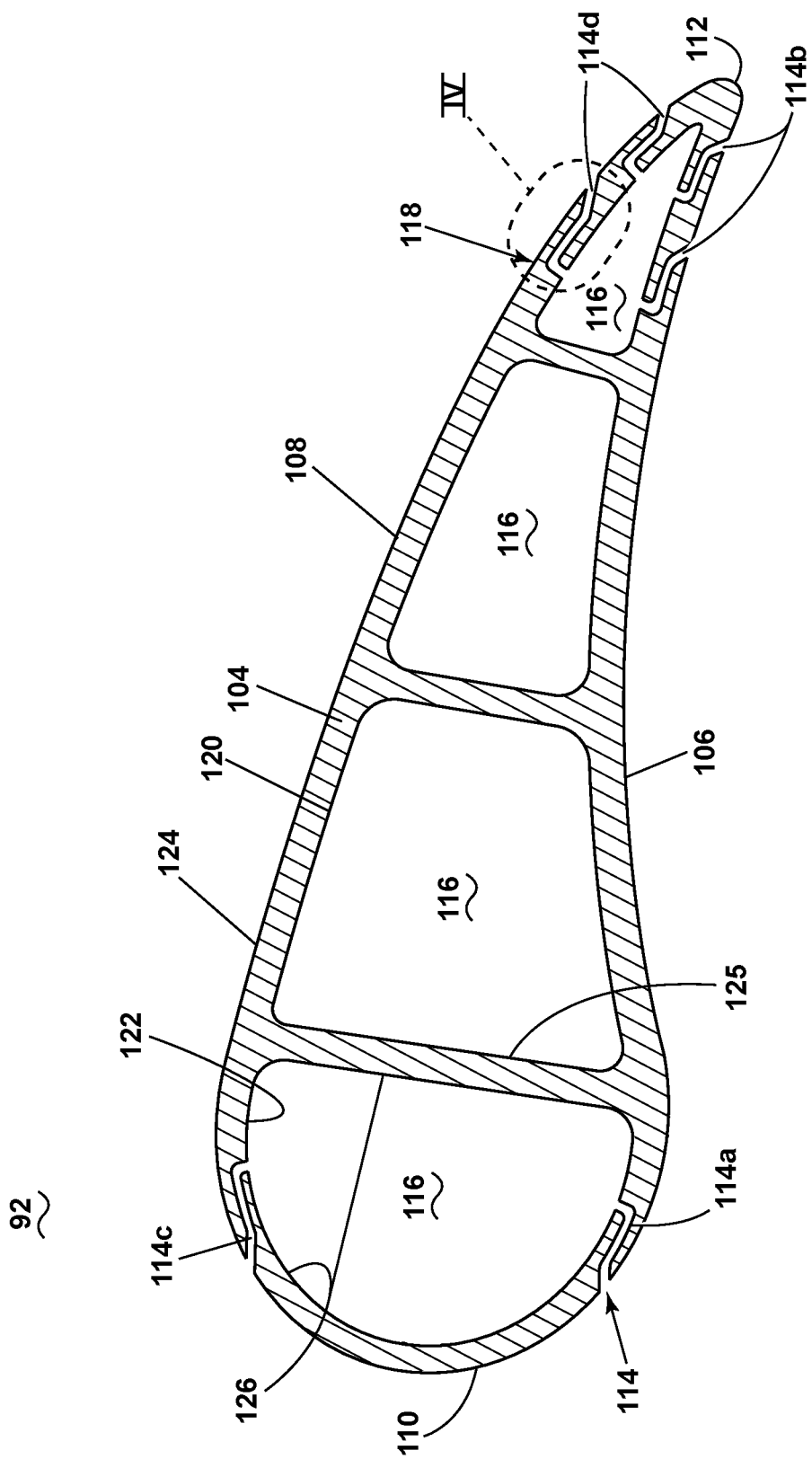
FIG. 3 is a cross-sectional view of the airfoil with the set of cooling passages taken along line of FIG. 2.

Referring now to FIG. 3, showing section of FIG. 2, the airfoil 92 includes an interior 120 defined by the outer wall 104. The outer wall 104 can further include an inner surface 122 and an outer surface 124, with the inner surface 122 defining the interior 120. A rib 125, illustrated as multiple ribs 125, can extend from the first side 106 of the outer wall 104 to the second side 108 of the outer wall 104, effectively separating the interior 120 into the separate cooling conduits 116. Conduit sidewalls 126 define the separate cooling conduits 116. The conduit sidewalls 126 can be defined by the inner surface 122 and defined at least in part by the rib 125. The cooling conduits 116 can form at least a portion of the cooling circuit 118 within the interior 120 of the airfoil 92. It should be appreciated that the rib 125, the cooling conduits 116, and the cooling circuit 118 as shown are exemplary, and a myriad of different cooling circuits 118 can be formed within the airfoil 92, including, but not limited to one or more of a cooling conduit, channels, passages, ducts, cooling inlets, full-length ribs or partial-length ribs in either the span-wise or streamwise planes, near wall cooling passages, turbulators, pins, fins, or any other structure forming the airfoil 92. A third and fourth set of cooling passages 114c, 114d is also illustrated as previously described herein along the second side 108.

The set of cooling passages 114 as described herein can be any of the first, second, third, or fourth sets of cooling passages 114a, 114b, 114c, 114d previously mentioned. For clarity all sets will be described simply as the set of cooling passages 114 from here on forward. The set of cooling passages 114 fluidly couple the interior 120 to the exterior of the airfoil 92 at the outer surface 124, and provide for exhausting a cooling fluid in the cooling fluid flow (C) near any portion of the airfoil 92 requiring cooling. The set of cooling passages 114 can be formed in the outer wall 104 and fluidly couple at least one of the cooling conduits 116 to the outer surface 124, by way of non-limiting example near the upstream edge 110 and the downstream edge 112 along the outer surface 124 as illustrated.

Figure 4:
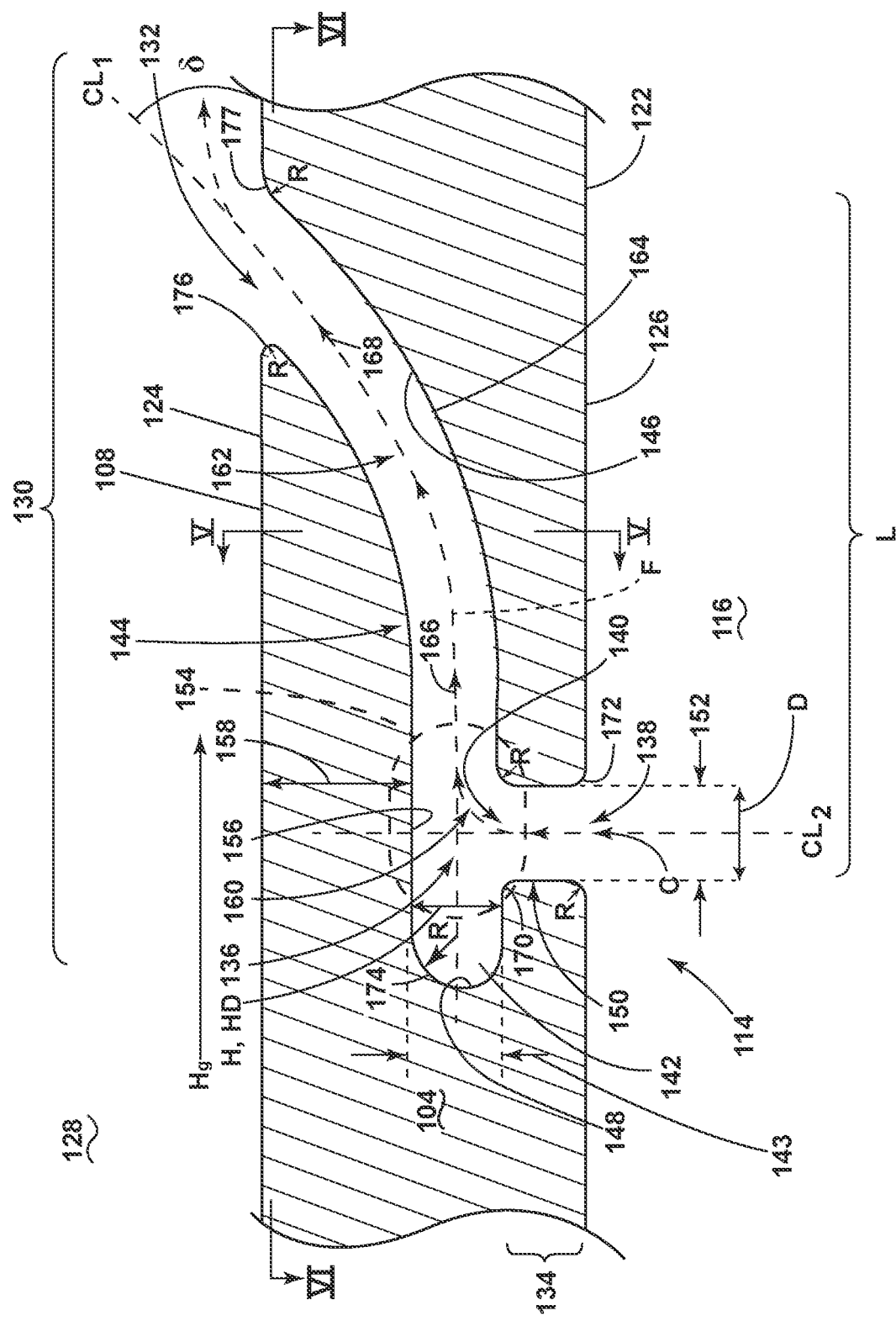
FIG. 4 is an enlarged view of a variation of a cooling passage from the set of cooling passages according to an aspect of the disclosure herein.

FIG. 4 is an enlarged view of a cooling passage 128 from the set of cooling passages 114d from FIG. 3. The cooling passage 128 can include a first cooling passage portion 130 having a surface outlet 132 opening on the outer surface 124. A second cooling passage portion 134 can intersect the first cooling passage portion 130 at a junction 136. The second cooling passage portion 134 can have an inlet 138 fluidly coupled to the cooling conduit 116 and an intermediate outlet 140 fluidly connecting the second cooling passage portion 134 to the first cooling passage portion 130 at the junction 136.

The cooling passage 128 extends between the inlet 138 and the surface outlet 132 to define a flow direction (F) illustrated in dashed line between the cooling conduit 116 and the outer surface 124. The first cooling passage portion 130 can include a diffusion slot 144 having slot sidewalls 146 extending along a first centerline (CL1) in the flow direction (F) between a rear wall 148 and the surface outlet 132. As illustrated, the first centerline (CL1) can include two parts, a first part that extends in a first direction 166 between the rear wall 148 and a bend 164 and a second part that extends in a second direction 168 from the bend 164 to the surface outlet 132 to form an angle ($\delta$) between 15 and 90 degrees. The angle ($\delta$) can also be between 15 and 135 degrees. When the flow direction (F) turns forwards for packaging constraint purposes, the angle ($\delta$) can be above 90 degrees to 165 degrees. The intermediate outlet 140 can be located proximate the rear wall 148, or spaced from the rear wall 148 as illustrated to define a pocket 142.

The first cooling passage portion 130 can have a non-circular cross section, though it could have any cross-sectional shape. The first cooling passage portion 130 can define a first cross-sectional area 143. A first dimension, by way of non-limiting example a height (H) of the first cooling passage portion 130 can extend a full length (L) of the diffusion slot 144 and be defined as a distance between the slot sidewalls 146 closest to the inner and outer surfaces 122, 124. The full length (L) of the diffusion slot can begin where the pocket 142 has a maximum height (H) as illustrated. In some implementations the height can be equal to the hydraulic diameter (HD) of the first cross-sectional area 143. The height (H) can be measured, by way of non-limiting example, at the junction 136 proximate the pocket 142. While the height (H) is illustrated as generally constant, it is contemplated that the height (H) can increase or decrease along the length (L) of the diffusion slot 144 depending on implementation and location in the airfoil 92.

The cooling passage 128 can include multiple bends, by way of non-limiting example at the junction 136 and the bend 164, resulting in turns along the flow direction (F). The junction 136 can define a first turn 160. The bend 164 can define a second turn 162 occurring within the first cooling passage portion 130 at a location between the intermediate outlet 140 and the surface outlet 132. The second turn 162 can be an acute turn where at least a portion of the second direction is the same as the first direction.

The second cooling passage portion 134 can define a metering section 150 having a circular cross section, though it could have any cross-sectional shape. The metering section 150 can define a second cross-sectional area 152 that is the smallest, or minimum cross-sectional area of the cooling passage 128. The second cross-sectional area 152 of the second cooling passage portion 134 can define a second dimension, by way of non-limiting example a diameter (D). The metering section 150 can extend along a second centerline (CL2) from the inlet 138 to the intermediate outlet 140. It is further contemplated that the second cross-sectional area 152 is maintained as a constant cross-sectional area 152 from the inlet 138 to the intermediate outlet 140. Maintaining a constant cross-sectional area 152 enables a controlled flow of the cooling fluid (C) upon entering the diffusion slot 144. The first and second dimensions can be equal to each other, in other words the height (H) of the first cooling passage portion 130 can equal the diameter (D) of the second cooling passage portion 134. In some cases the first and second dimensions will differ from each other by 60-85% where 100% would be height (H) is equal to diameter (D).

It is also contemplated that the metering section 150 can have no length and is located at any portion of the cooling passage 128 where the cross-sectional area is the smallest. It is further contemplated that the metering section 150 can define the inlet 138 without extending into the cooling passage 128 at all. The cooling passage 128 can include multiple metering sections and is not limited to one as illustrated. The metering section 150 is for metering of the mass flow rate of the cooling fluid flow (C).

An impingement zone 154 can be formed at the junction 136 by the intersection of the first cooling passage portion 130 and the second cooling passage portion 134. The first cooling passage portion 130 can define an impingement surface 156 facing the intermediate outlet 140 of the second cooling passage portion 134. The impingement zone 154 can include the intermediate outlet 140 and the impingement (D) 156 where the cooling fluid (C) exiting the intermediate outlet 140 from the second cooling passage portion 134 impinges, or hits. As illustrated, the impinging can be toward the second side 108 so that impingement occurs at the outer wall 104 along the second side 108 resulting in cooling of the second side 108. An impingement distance 158 is defined as the thickness of the outer wall 104 between the outer surface 124 and the impingement surface 156. Increasing this thickness can enable more controlled conductive cooling of the outer wall 104, which in turn produces a minimal increase in the temperature of the cooling fluid (C) when exiting the surface outlet 132. Decreasing this thickness can enable direct cooling of the outer wall 104, which in turn cools the wall more, and causes a larger increase in the temperature of the cooling fluid (C) when exiting the surface outlet 132. It should be understood, that impinging can occur toward any side resulting in cooling any portion of the engine component described herein.

An intermediate fillet 170 can connect the first cooling passage portion 130 to the second cooling passage portion 134. The intermediate fillet 170 can have a radius (R) with an upper limit of a second ratio of the diameter (D) to the radius (R) being greater than or equal to .010: (D/R≥1/10). It is contemplated that the second ratio (D/R) falls between or is equal to 0.05 and 50: (0.05≤D/R≤50). It is further contemplated that the second ratio (D/R) falls between or is equal to 0.08 and 30: (0.08≤D/R≤30). The radius (R) can be greater than 0.002 inches. In other implementations the radius (R) can be greater than or equal to 0.00005 inches and less than or equal to 0.04 inches. The intermediate fillet 170 enables a smooth flow with little turbulence thereby increasing cooling performance. It is contemplated that the intermediate fillet 170 produces a laminar or close to laminar flow of the cooling fluid (C) in the flow direction (F) at the intermediate outlet 140. The intermediate fillet 170 can define a portion or a full perimeter of the intermediate outlet 140.

An inlet fillet 172 can connect the conduit sidewalls 126 to the second cooling passage portion 134. The inlet fillet 172 can have a radius (R) with an upper limit of the first ratio of the diameter (D) to the radius (R) being greater than or equal to 0.10: (D/R≥1/10). It is contemplated that the second ratio (D/R) falls between or is equal to 0.05 and 50: (0.05≤D/R≤50). It is further contemplated that the second ratio (D/R) falls between or is equal to 0.08 and 30: (0.08≤D/R≤30). The radius (R) can be greater than 0.002 inches. In other implementations the radius (R) can be greater than or equal to 0.00005 inches and less than or equal to 0.04 inches. The inlet fillet 172 directly reduces losses within the cooling passage 128. With the inlet fillet 172, the cooling passage 128 is more robust to variation in the incoming flow of the cooling fluid (C) at the inlet 138. Further, the inlet fillet 172 enables a smooth flow with little turbulence thereby increasing cooling performance. It is contemplated that the inlet fillet 172 produces a laminar or close to laminar flow of the cooling fluid (C) in the flow direction (F) at the inlet 138. The inlet fillet 172 can define a portion or a full perimeter of the inlet 138.

A rear fillet 174 can connect the slot sidewalls 146 to the rear wall 148. The rear fillet 174 can have a radius (R) with an upper limit of a first ratio of the height (H) to the radius (R) being greater than or equal to 0.1: (H/R≥1/10). It is contemplated that the first ratio (H/R) falls between or is equal to 2 and 40: (2≤H/R≤40). It is further contemplated that the first ratio (H/R) falls between 0.08 and 7: (0.250≤H/R≤25.0). The radius (R) can be greater than 0.002 inches. In other implementations the radius (R) can be greater than or equal to 0.00005 inches and less than or equal to 0.04 inches. The rear fillet 174 reduces "dead zones" in the cooling passage 128, "dead zones" being areas in which the cooling fluid (C) becomes stagnant. The rear fillet 174 can condition flow of the cooling fluid (C) to consistently and slowly fill the entire cooling passage 128, which helps provide improved flow characteristics at the surface outlet 132. The rear fillet 174 can define a portion or a full curvature of the rear wall 148.

A hood fillet 176 can connect the slot sidewalls 146 to the outer surface 124. The hood fillet 176 can have a radius (R) with an upper limit of the second ratio of the height (H) to the radius (R) being greater than or equal to 0.1: (H/R≥1/10). It is contemplated that the first ratio (H/R) falls between or is equal to 0.05 and 40: (0.05≤H/R≤40). It is further contemplated that the first ratio (H/R) falls between or is equal to 0.08 and 7: (0.08≤H/R≤7). The radius (R) can be greater than 0.002 inches. In other implementation the radius (R) can be greater than or equal to 0.002 inches and less than or equal to 0.04 inches. The hood fillet 176 enables a smooth flow with little turbulence thereby increasing cooling performance. It is contemplated that the hood fillet 176 produces a laminar or close to laminar flow of the cooling fluid (C) in the flow direction (F) at the surface outlet 132.

An outlet fillet 177 can connect the slot sidewalls 146 to the outer surface 124 on a downstream end of the surface outlet 132. The outlet fillet 177 can have a radius (R) with an upper limit of the second ratio of the height (H) to the radius (R) being greater than or equal to 0.1: (H/R≥1/10). It is contemplated that the first ratio (H/R) falls between or is equal to 0.10 and 40: (0.10≤H/R≤40). It is further contemplated that the first ratio (H/R) falls between or is equal to 0.1 and 7: (0.1≤H/R≤7). The radius (R) can be greater than 0.002 inches. In other implementation the radius (R) can be greater than or equal to 0.002 inches and less than or equal to 0.04 inches. The outlet fillet 177 enables a smooth flow with little turbulence thereby increasing cooling performance. It is contemplated that the outlet fillet 177 produces a laminar or close to laminar flow of the cooling fluid (C) in the flow direction (F) at the surface outlet 132.

The addition of the fillets as described herein are beneficial for multiple reasons. The fillets reduce losses through the cooling passage 128, improve consistency of the cooling fluid (C) leaving the surface outlet 132 in that the flow is less susceptible to variation, and improve effectiveness provided by impingement of the cooling fluid (C) in the impingement zone 154. All of the above being beneficial to improved film on the outer wall 104.

Figure 5:
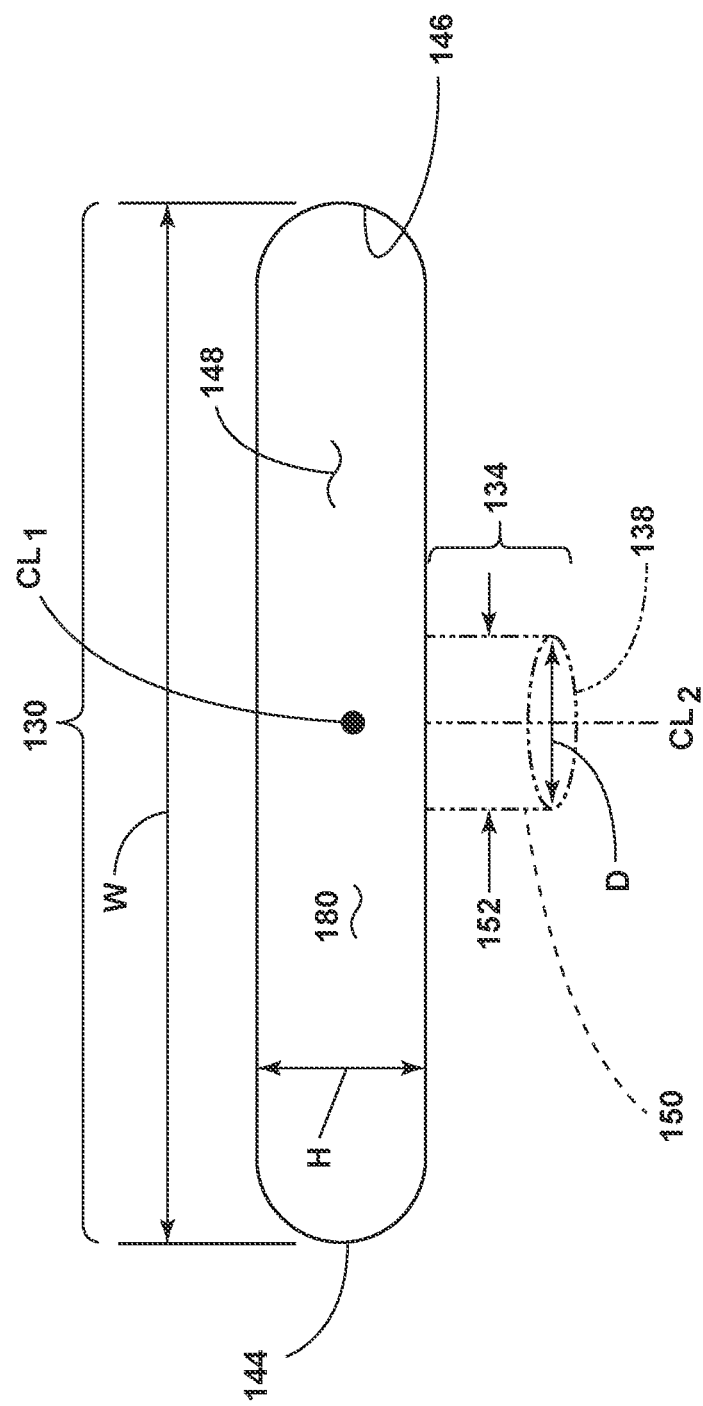
FIG. 5 is a cross-sectional view of the cooling passage taken along line V-V of FIG. 4.

FIG. 5 is a view looking toward the rear wall 148 taken along line V-V of FIG. 4 in the first cooling passage portion 130. The first cooling passage portion 130 can have an increasing cross-sectional area 180 to define the diffusion slot 144 as having a long narrow shape in that the height (H) is smaller than a width (W). It should be understood that the width (W) is measured perpendicular to the height (H) a largest distance between the remaining slot sidewalls 146.

It can more clearly be seen that the second cross-sectional area 152 of the second cooling passage portion 134 can define the diameter (D). It should be understood that if the second cross-sectional area 152 is of a non-circular shape, the diameter (D) is the hydraulic diameter (HD) of the non-circular shape.

Figure 6:
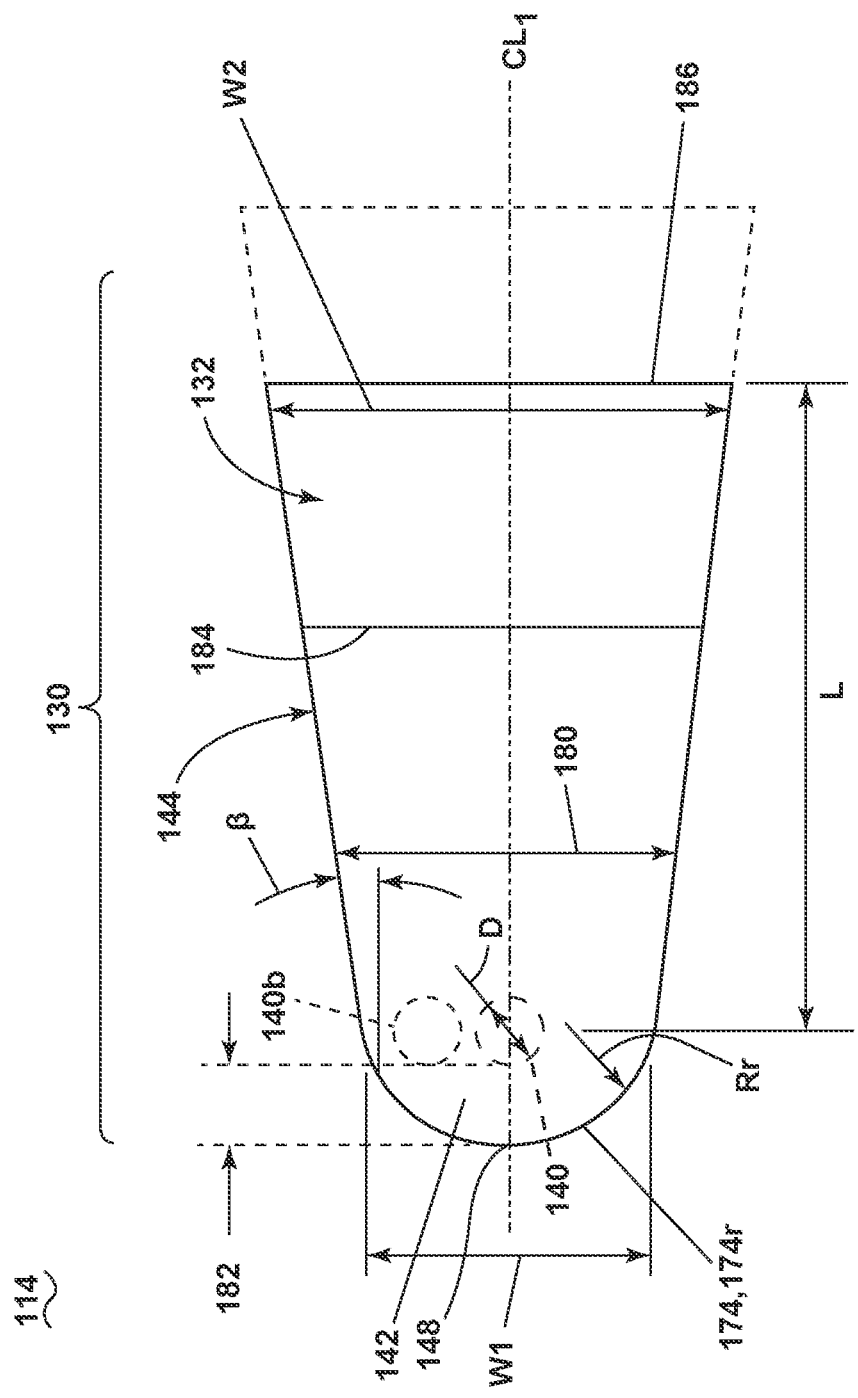
FIG. 6 is a top down view of the cooling passage taken from line VI-VI of FIG. 4.

Turning to FIG. 6, as illustrated in a top down view taken from line VI-VI of FIG. 4, it is further contemplated that the intermediate outlet 140 is spaced downstream of the rear wall 148 a distance 182 equal to or less than five times the diameter (D) (Distance 182≤5D). In other implementations, the distance 182 is less than two times the diameter (D) (Distance 182≤2D). It is further contemplated that the intermediate outlet 140 is spaced from the rear wall 148 a distance greater than five times the diameter (D). When spaced, the spacing should be sufficient to define the pocket 142 at the rear wall 148.

It can more clearly be seen that the increasing cross-sectional area 180 can be increasing along the width (W). At least one of the slot sidewalls 146 can fan out at an angle (β) relative to the first centerline (CL1) and extend toward surface outlet 132. In some implementations (0≤β). An angle of zero would be a generally straightwardly sidewall. A straight diffusion slot 144 would be formed with two parallel sidewalls. In some implementations (β≤0). In other words at least one of the sidewalls bend inward. It is contemplated that both or one slot sidewall 146 can fan out, extend straightwardly, or bend inward. It is further contemplated that the angle (β) is between −20° and 20°.

The diffusion slot 144 extends from the rear wall 148 toward the surface outlet 132 and expands primarily in one direction along the width (W). A width (W1) of the diffusion slot 144 at the intermediate outlet 140 can be equal to between 1 and 20 diameters (D). The increasing cross-sectional area 180 terminates in a width (W2) at the surface outlet 132 a distance (L) from the intermediate outlet 140. The distance (L) is between 2 and 25 diameters (D) from the center of the intermediate outlet 140. The surface outlet 132 can extend between an upstream end 184 and a downstream end 186 and the distance (L) can be measured from the center of the intermediate outlet 140 to the downstream end 186 as illustrated.

The diffusion slot 144 geometry results in the surface outlet 132 having a trapezoidal shape, or rounded trapezoidal shape when looking at the outer surface 124. The trapezoidal shape of the surface outlet 132 can be truncated as illustrated or elongated as illustrated in phantom. The first passage portion 130, and more particularly the geometry of the diffusion slot 144 enables an expansion of the cooling fluid (C) to form a wider and slower cooling film on the outer surface 124, or heated surface, of the airfoil 92 (FIG. 2).

The rear fillet 174 can expand in multiple dimensions. As illustrated here the rear wall 148 can have a radial rear wall fillet 174r defining the rear wall 148. The radial rear wall fillet 174r can be defined by a radius (Rr) that is an eighth of the diameter (D) to 10 times the diameter (D) (⅛D to 10D) depending on the size of the pocket 142 at the rear wall 148.

It is further contemplated that an intermediate outlet 140b is unaligned with the first centerline (CL1) as illustrated in phantom. The placement of the intermediate outlet 140b and the geometry of the diffusion slot 144 depend on the location of the set of cooling passages 114 within the engine component and packaging of multiple cooling passages 128 with respect to each other.

Figure 7:
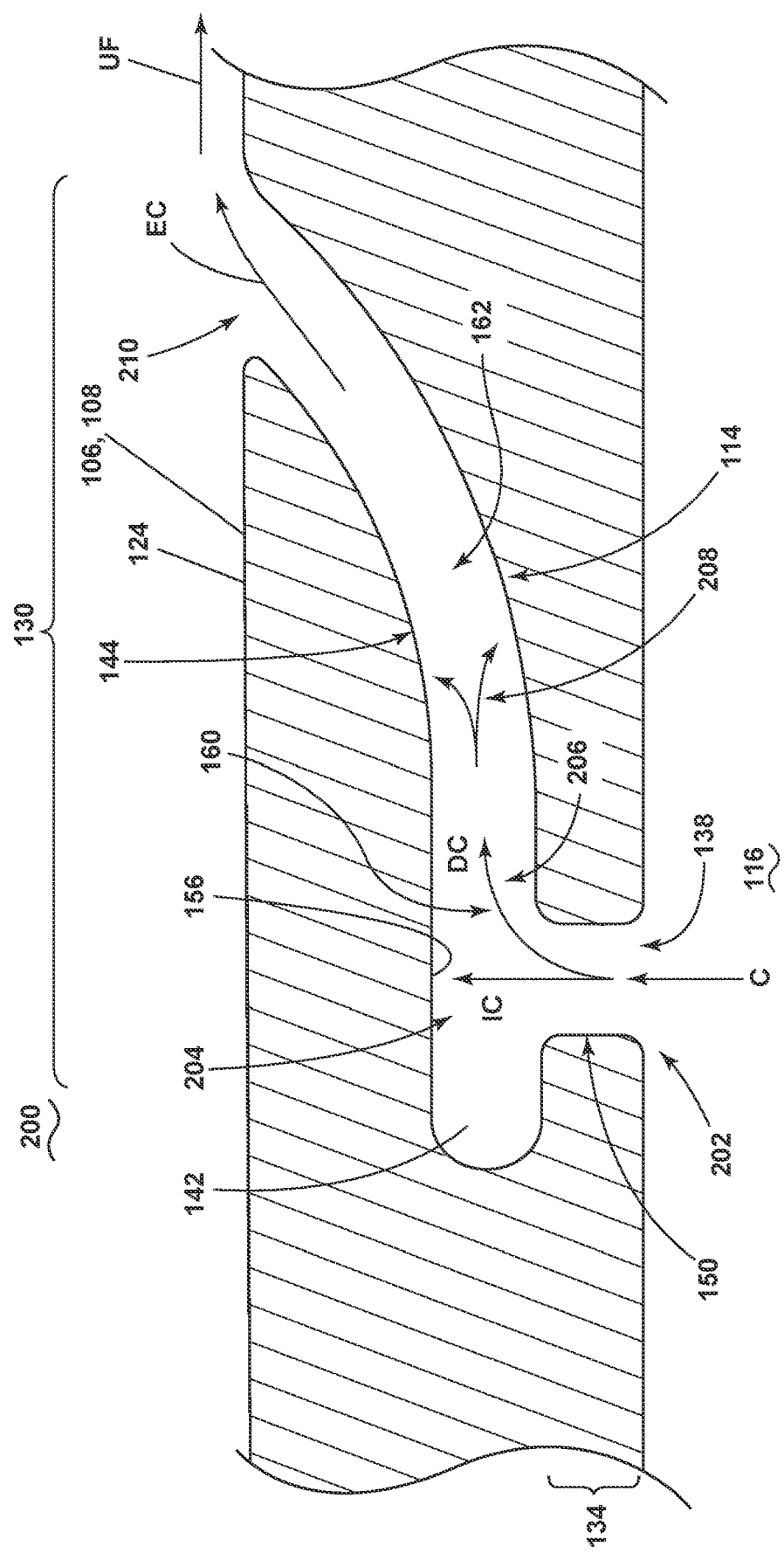
FIG. 7 is the enlarged view of FIG. 4 illustrating a method of cooling an engine component.

Turning to FIG. 7, a method 200 for cooling an engine component is illustrated. The method can include flowing the cooling fluid (C) through the cooling conduits 116 and passing the cooling fluid (C) to the set of cooling passages 114. In operation the cooling fluid (C) can be received at 202 in the inlet 138 and flow through the metering section 150 toward the diffusion slot 144. At 204 the cooling fluid (C) can impinge on the impingement surface 156 of the diffusion slot 144 and becomes an impinged cooling fluid (IC). At 206 the method 200 can include turning the impinged cooling fluid (IC) through the first turn 160 into the diffusion slot 144 to become a diffused cooling fluid (DC). Depending on the extent of the diffusion slot 144, at 208 the diffused cooling fluid (DC) can expand in one direction, primarily into and out of the page, or radially with respect to the airfoil 92 (FIG. 3). At 210 the diffused cooling fluid can be emitted from the diffusion slot 144. In this manner, an emitted cooling fluid (EC) maintains a uniform height and therefore a uniform film (UF) on the outer surface 124 of the airfoil 92. The method 200 can include cooling the corresponding first side 106 or the second side 108.

The method 200 can include cleaning the cooling fluid (C) by utilizing the pocket 142 prior to flowing the cooling fluid (C) through first cooling passage portion 130 by capturing particles in the pocket 142 prior to diffusing the cooling fluid (C). The method 200 can further include turning the cooling fluid (C) at the second turn 162 toward the outer surface 124 prior to emitting the cooling fluid (C).

Figure 8:
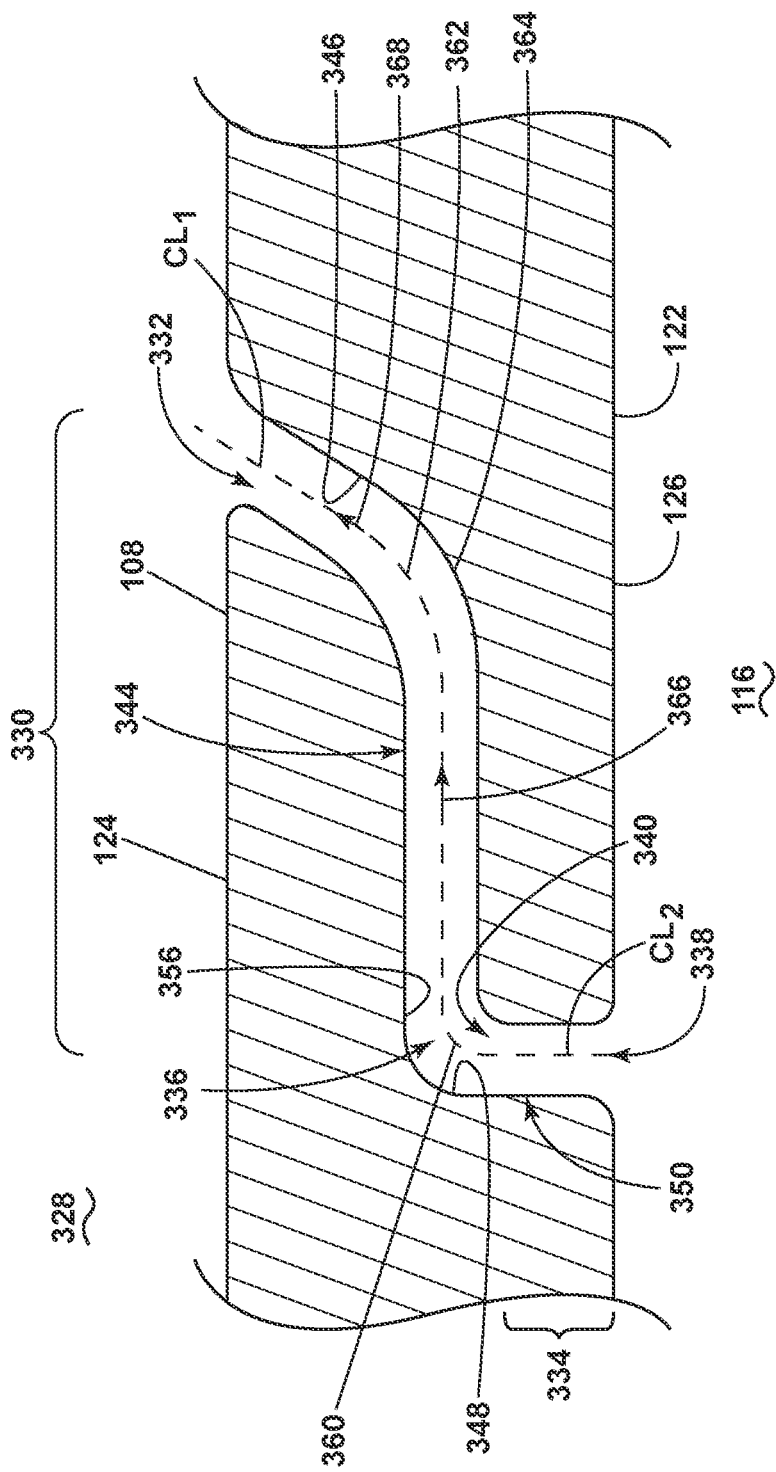
FIG. 8 is an enlarged view of an alternative cooling passage from the set of cooling passages according to another aspect of the disclosure herein.

Turning to FIG. 8, a cooling passage 328 similar to the cooling passage 128 (FIG. 4) is illustrated. It should be understood that the cooling passage 328 can be part of the set of cooling passages 114 (FIG. 2) as described herein. Like parts will be identified with like numerals increased by 200. Unless otherwise noted, the description of the like parts of the cooling passage 128 (FIG. 4) applies to the cooling passage 328, including parts not numbered for clarity.

The cooling passage 328 can include a first cooling passage portion 330 having a surface outlet 332 opening on the outer surface 124. A second cooling passage portion 334 can intersect the first cooling passage portion 330 at a junction 336. The second cooling passage portion 334 can have an inlet 338 fluidly coupled to the cooling conduit 116 (FIG. 2) and an intermediate outlet 340 fluidly connecting the second cooling passage portion 334 to the first cooling passage portion 330 at the junction 336. The first cooling passage portion 330 can include a diffusion slot 344 having slot sidewalls 346 extending between a rear wall 348 and the surface outlet 332. The intermediate outlet 340 can be located at the rear wall 348. In other words, the second cooling passage portion 334 can align with the rear wall 348.

Figure 9:
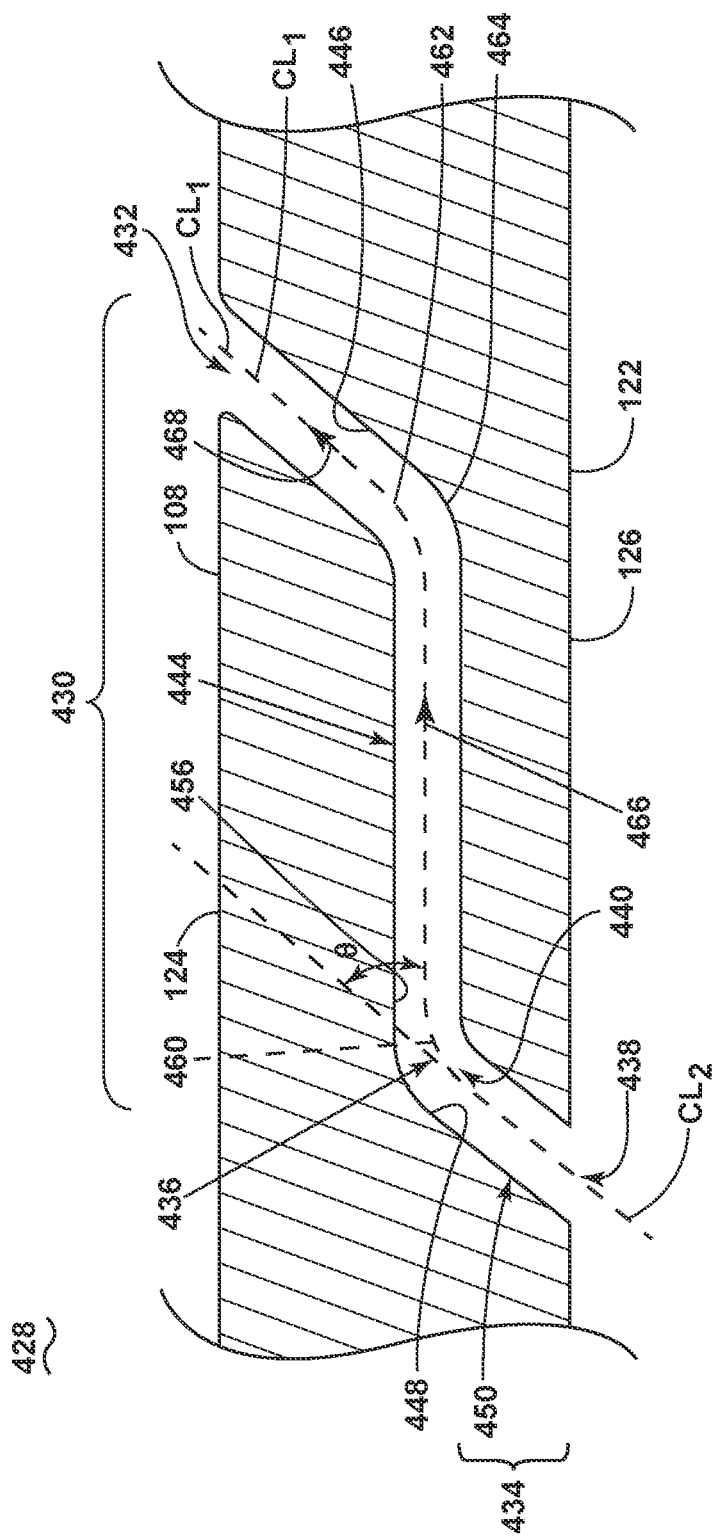
FIG. 9 is an enlarged view of an alternative cooling passage from the set of cooling passages according to another aspect of the disclosure herein.

Turning to FIG. 9, a cooling passage 428 similar to the cooling passage 128 (FIG. 4) is illustrated. It should be understood that the cooling passage 428 can be part of the set of cooling passages 114 (FIG. 2) as described herein. Like parts will be identified with like numerals increased by 300. Unless otherwise noted, the description of the like parts of the cooling passage 128 applies to the cooling passage 428, including parts not numbered for clarity.

The cooling passage 428 can include a first cooling passage portion 430 having a surface outlet 432 opening on the outer surface 124. The first cooling passage portion 430 can include a diffusion slot 444 having slot sidewalls 446 extending along a first centerline (CL1) between a rear wall 448 and the surface outlet 432. A second cooling passage portion 434 can intersect the first cooling passage portion 430 at a junction 436. The second cooling passage portion 434 can have an inlet 438 fluidly coupled to the cooling conduit 116 and an intermediate outlet 440 fluidly connecting the second cooling passage portion 434 to the first cooling passage portion 430 at the junction 436. The second cooling passage portion 434 can extend along a second centerline (CL2) from the inlet 438 to the intermediate outlet 440. The intermediate outlet 440 can be located at the rear wall 448. In other words, the second cooling passage portion 434 can align with the rear wall 448.

As illustrated, the first centerline (CL1) can include two parts, a first part that extends in a first direction 466 between the rear wall 448 and a bend 464 and a second part that extends in a second direction 468 from the bend 464 to the surface outlet 432. The second centerline (CL2) can be angled with respect to the conduit sidewalls 126. The second centerline (CL2) can extend toward the junction 436 in the second direction and intersect with the first centerline (CL1) to form an acute angle ($\theta$). The second centerline (CL2) and the second part of the first centerline (CL1) can be parallel to each other.

Figure 10:
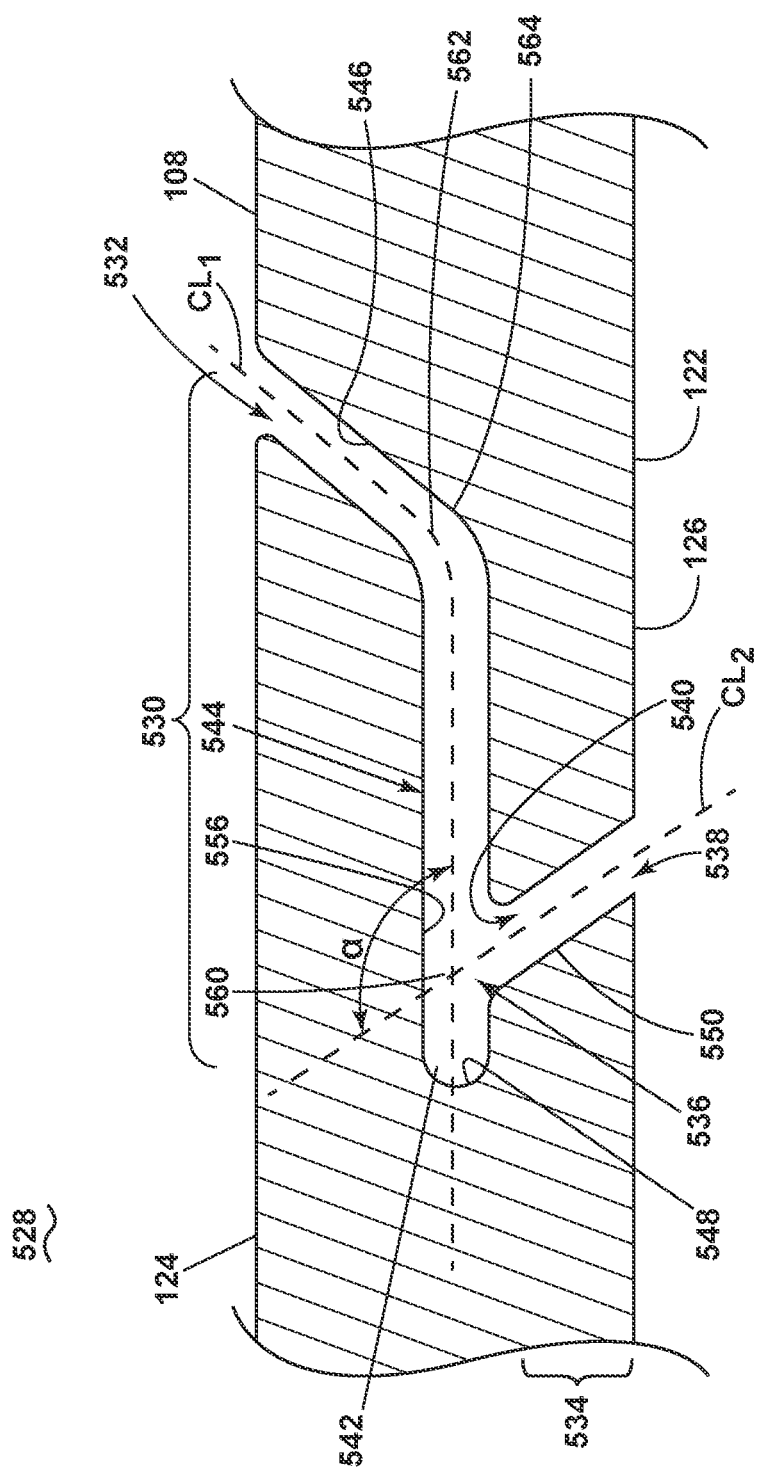
FIG. 10 is an enlarged view of an alternative cooling passage from the set of cooling passages according to another aspect of the disclosure herein.

Turning to FIG. 10, a cooling passage 528 similar to the cooling passage 128 (FIG. 4) is illustrated. It should be understood that the cooling passage 528 can be part of the set of cooling passages 114 (FIG. 2) as described herein. Like parts will be identified with like numerals increased by 400. Unless otherwise noted, the description of the like parts of the cooling passage 128 applies to the cooling passage 528, including parts not numbered for clarity.

The cooling passage 528 can include a first cooling passage portion 530 having a surface outlet 532 opening on the outer surface 124. The first cooling passage portion 530 can include a diffusion slot 544 having slot sidewalls 546 extending along a first centerline (CL1) between a rear wall 548 and the surface outlet 532. A second cooling passage portion 534 can intersect the first cooling passage portion 530 at a junction 536. The second cooling passage portion 534 can have an inlet 538 fluidly coupled to the cooling conduit 116 and an intermediate outlet 540 fluidly connecting the second cooling passage portion 534 to the first cooling passage portion 530 at the junction 536. The second cooling passage portion 534 can extend along a second centerline (CL2) from the inlet 538 to the intermediate outlet 540. The intermediate outlet 540 can be spaced from the rear wall 548 as illustrated to define a pocket 542.

The first centerline (CL1) can include two parts, a first part that extends in a first direction between the rear wall 548 and a bend 564 and a second part that extends in a second direction from the bend 564 to the surface outlet 532. The bend 564 can define an acute turn 562. In other words, at least a portion of the second direction is the same as the first direction. The second centerline (CL2) can extend toward the junction 536 in a third direction different than the first or second direction and intersect with the first centerline (CL1) to form an obtuse angle ($\alpha$). An extension of the second centerline (CL2) and the second part of the first centerline (CL1) can intersect below the inner surface 122.

Figure 11:
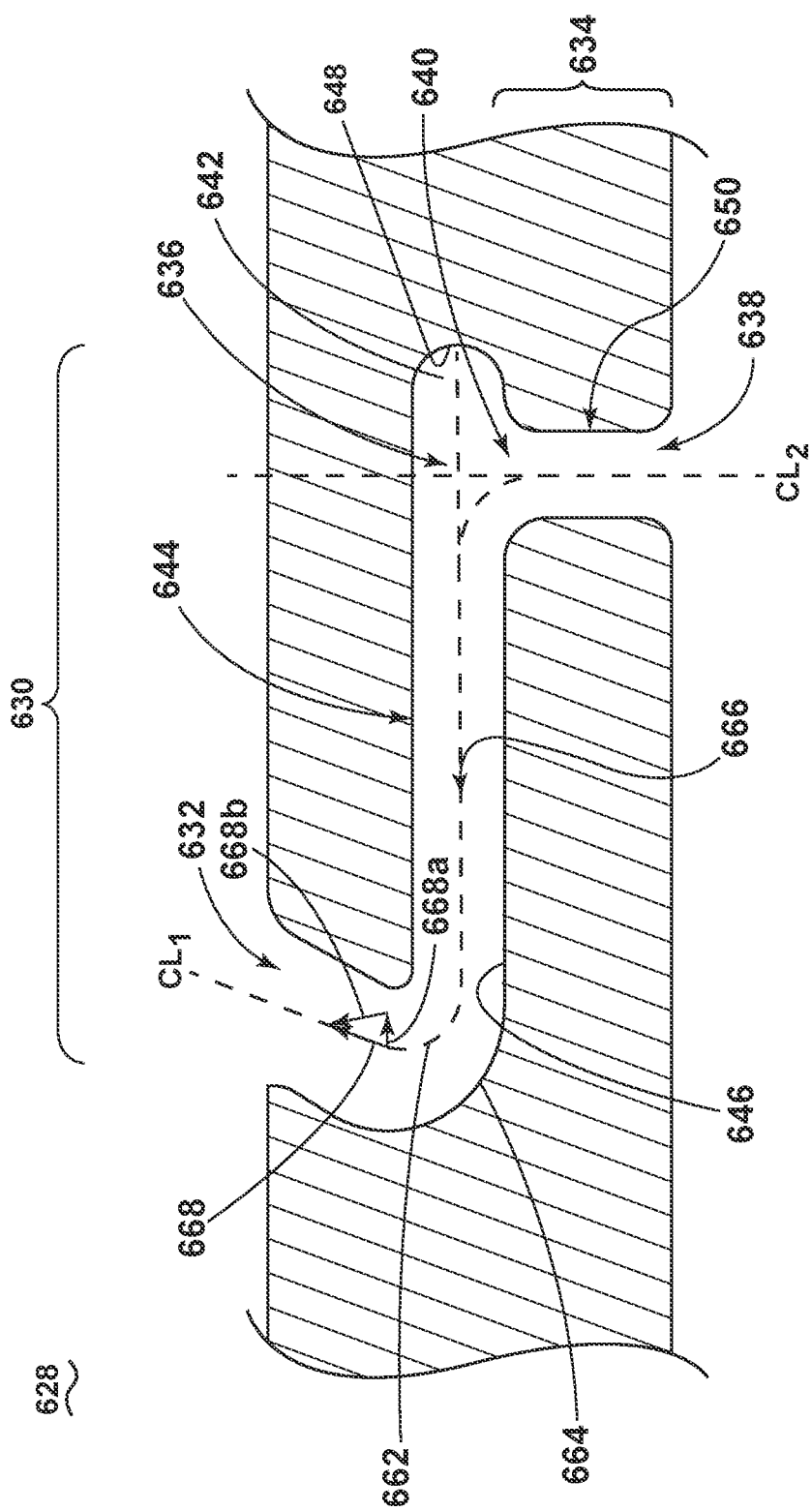
FIG. 11 is an enlarged view of an alternative cooling passage from the set of cooling passages according to another aspect of the disclosure herein.

Turning to FIG. 11, a cooling passage 628 similar to the cooling passage 128 (FIG. 4) is illustrated. It should be understood that the cooling passage 628 can be part of the set of cooling passages 114 (FIG. 2) as described herein. Like parts will be identified with like numerals increased by 500. Unless otherwise noted, the description of the like parts of the cooling passage 128 applies to the cooling passage 628, including parts not numbered for clarity.

The cooling passage 628 can include a first cooling passage portion 630 having a surface outlet 632 opening on the outer surface 124. The first cooling passage portion 630 can include a diffusion slot 644 having slot sidewalls 646 extending along a first centerline (CL1) between a rear wall 648 and the surface outlet 132. A second cooling passage portion 634 can intersect the first cooling passage portion 630 at a junction 636. The second cooling passage portion 634 can have an inlet 638 fluidly coupled to the cooling conduit 116 (FIG. 2) and an intermediate outlet 640 fluidly connecting the second cooling passage portion 634 to the first cooling passage portion 630 at the junction 636. The second cooling passage portion 634 can extend along a second centerline (CL2) from the inlet 638 to the intermediate outlet 640. The intermediate outlet 640 can be spaced from the rear wall 648 as illustrated to define a pocket 642.

The first centerline (CL1) can include two parts, a first part that extends in a first direction 666 between the rear wall 648 and a bend 664 and a second part that extends in a second direction 668 from the bend 664 to the surface outlet 632. The bend 664 can define an obtuse turn 662. In other words, at least a portion 668a of the second direction 668 is opposite the first direction 666. The second centerline (CL2) can extend toward the junction 636 in a third direction perpendicular to the first direction, different from the second direction, and intersecting with the first centerline (CL1). An extension of the second centerline (CL2) and the second part of the first centerline (CL1) can intersect above the outer surface 124.

Figure 12:
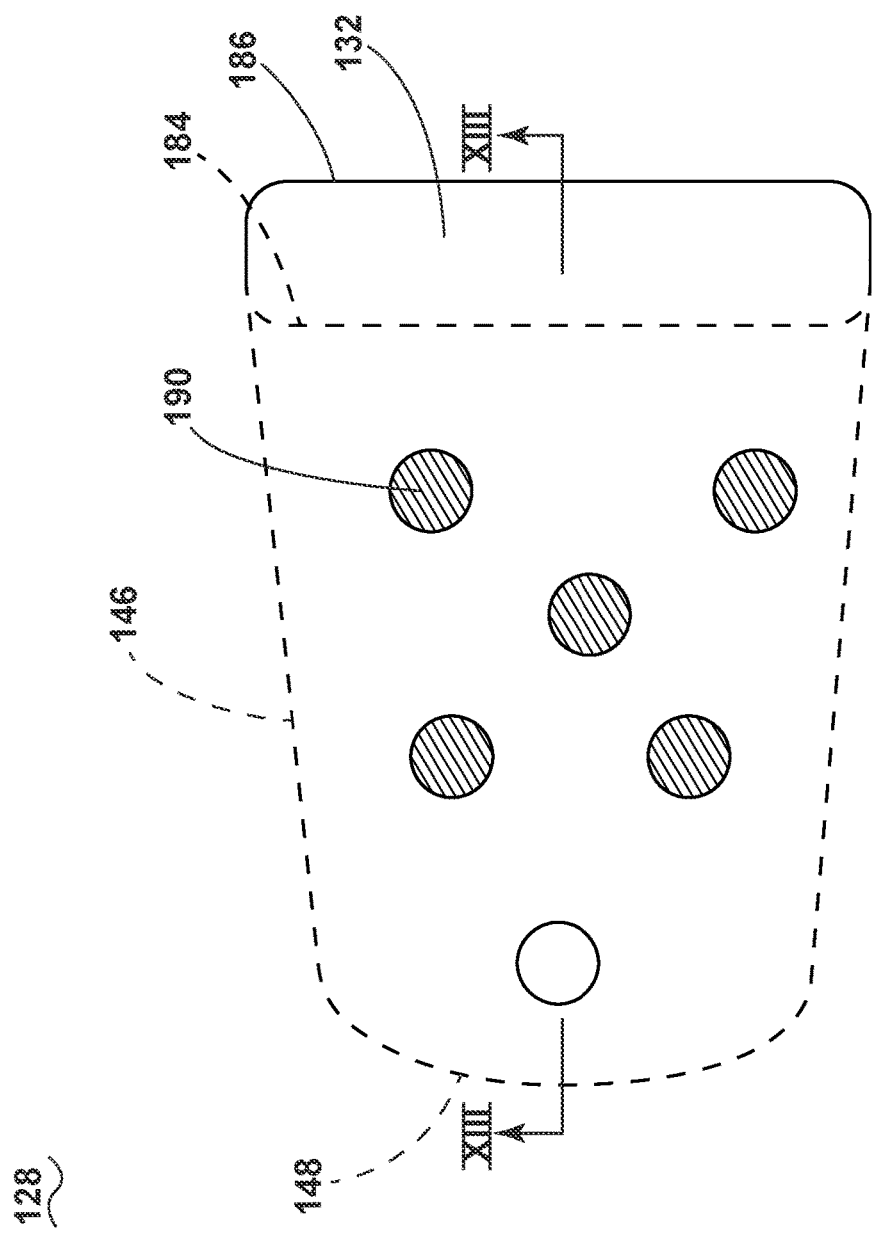
FIG. 12 is a top view of any of the cooling passages illustrated herein with a set of flow enhancers.

FIG. 12 is a top down view of any one of the cooling passages 128, 328, 428, 528, 628, as illustrated in FIGS. 4 and 8-11. While part numbers for cooling passage 128 are illustrated, it is contemplated that any of the cooling passages 128, 328, 428, 528, 628, as described herein, can include a set of flow enhancers 190, by way of non-limiting example full height heat transfer coefficient (HTC) augmentation features such as pins, etc., or partial height HTC augmentation features such as turbulators, bumps, dimples, etc. A higher HTC causes an increase in cooling of the outer wall 104 along with an increase in the temperature of the cooling fluid (C). Balancing where the benefit of the cooling in one area outweighs the increase in temperature of the cooling fluid (C) is enabled by placement of the HTC augmentation features.

Figure 13:
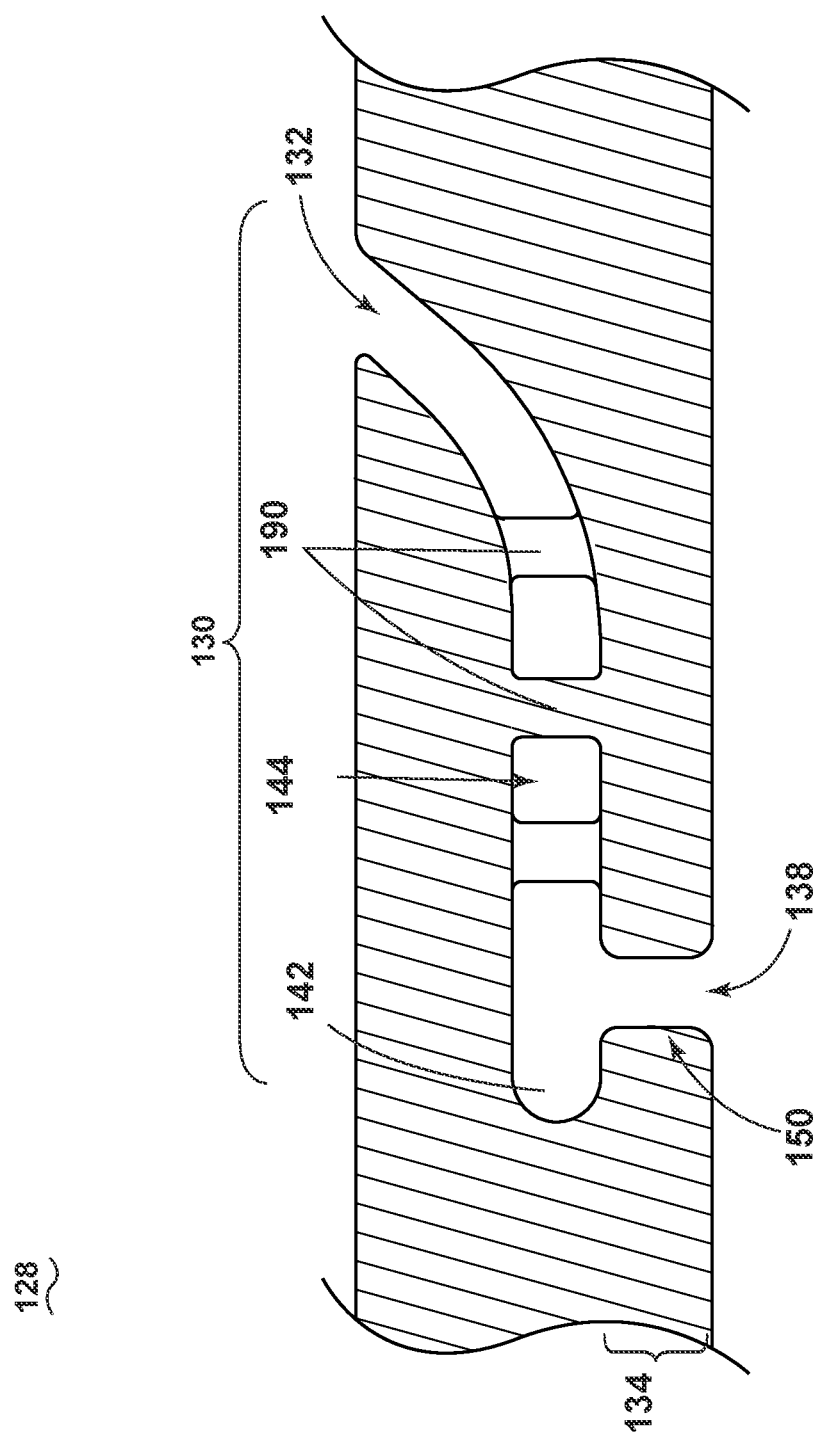
FIG. 13 is a cross-sectional view of FIG. 12 along line XIII-XIII where the flow enhancers are pins.

As is illustrated in FIG. 13, the set of flow enhancers 190 can be pins extending a full height of the cooling passage 128.

The second cooling passage portion as described herein can also include a bend defining a turn prior to the junction. Furthermore, while the wall of the engine component described herein is illustrated as generally straight with an inner and outer surface parallel to each other, the engine component, or the airfoil as described herein, can be curved and oriented at an angle with respect to the combustion flow. While illustrated as generally consistent or continuously widening, the passage cross section as described herein can be collapsing, widening, etc. allowable variation in both directions. Variation can be nonlinear, nonconstant, etc.

The set of cooling passages as described herein can include at least two cooling passages that have surface outlets that are merged together, forming a trench. It is further contemplated that all the cooling passages in a set of cooling passages have surface outlets that merge together to form a trench. The trench can extend radially along the airfoil.

It should be appreciated that the cooling passages as described herein can be provided in any portion of an airfoil or engine component. Furthermore, it should be appreciated that the cooling passages as described herein can have additional applicability to other portions of an airfoil, such as the leading edge, the trailing edge, the pressure side, the suction side, the tip, the root, or even an interior structure of the airfoil, for example. Further still, the cooling hole geometry can have applicability in other engine components, beyond that of an airfoil, such as in a blade, a vane, a strut, a shroud, or a combustor liner in non-limiting examples.

The cooling passages and other complex geometries as described herein can be formed, for example, by additive manufacturing, while traditional methods of manufacture are contemplated. An additive manufacturing (AM) process is where a component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. Additive manufacturing, such as 3D printing, direct metal laser melting, direct metal laser sintering, or electroforming, can provide for forming the complex geometries as described herein, where such formation by way of traditional manufacture, such as casting or drilling, can be challenging, costly, or time consuming, as well as having poor yields. Further the cooling passages described herein can be produced via indirect additive method, i.e. print the cores and cast, or casting via additively producing a core, or making the core via RMC can also be utilized.

In addition to the benefits already described herein, the fillets described herein enable various advantages to how the cooling fluid (C) performs, as well as stress benefits. In indirect manufacturing methods (such as casting), the addition of the fillet helps prevent issues such as core breakage, recrystallization (in the case of a single crystal alloy), and defects at the cooling holes.

Furthermore, the cooling passages and concepts described herein provide for improved local cooling, such as improved impingement cooling. Also, diffusion slot of the outlet passages can provide for a greater surface area for convective cooling of the airfoil, as well as providing for a wider layer of cooling film along the exterior of the airfoil, which provides for a more effective cooling film with greater attachment. The improved cooling can require less cooling air, which can require less bleed air. The lesser amount of required cooling air can lead to increased engine efficiency and decreased specific fuel consumption. The improved film cooling can provide for greater operational temperatures, which can increase engine efficiency, as well as improve component lifetime and reduce maintenance.

It should be appreciated that application of the disclosed design is not limited to turbine engines with fan and booster sections, but is applicable to turbojets and turbo engines as well.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An engine component for a turbine engine having a working airflow separated into a cooling airflow and a combustion airflow, the engine component comprising an outer wall defining an interior and having an outer surface over which flows the combustion airflow, the outer surface defining a first side and a second side extending between an upstream edge and a downstream edge and extending between a root and a tip, at least one cooling conduit provided in the interior and having conduit sidewalls; a set of cooling passages formed in the outer wall and fluidly coupling the at least one cooling conduit to the outer surface, at least one of the cooling passages in the set comprising: a first cooling passage portion having a first cross-sectional area defining a first dimension and having a surface outlet opening on the outer surface; a second cooling passage portion having a second cross-sectional area defining a second dimension, the second cooling passage portion intersecting the first cooling passage portion to define a junction, and having an inlet fluidly coupled to the cooling conduit and an intermediate outlet fluidly connecting the second cooling passage portion to the first cooling passage portion at the junction; an impingement zone formed at the junction of the first cooling passage portion and the second cooling passage portion, with the first cooling passage defining an impingement surface facing the intermediate outlet of the second cooling passage portion; a diffusion slot formed in the first cooling passage portion and having slot sidewalls defining a first centerline; and at least one fillet located within at least one of the first cooling passage portion or the second cooling passage portion and having a radius defined by a ratio defined as either: a first ratio equal to the first dimension (H) to the radius (R): (H/R), or a second ratio equal to the second dimension (D) to the radius (R): (D/R); wherein the first and second ratios are each greater than 1/10 (0.10).

The engine component of any preceding clause wherein the at least one fillet, is at least one of an inlet fillet or an intermediate fillet with a radius (R) associated with the second ratio (D/R).

The engine component of any preceding clause wherein the intermediate fillet is located along a downstream edge of the intermediate outlet.

The engine component of any preceding clause wherein the intermediate fillet defines a perimeter of the intermediate outlet.

The engine component of any preceding clause wherein the at least one fillet is an outlet fillet defining at least a portion of the surface outlet located at a downstream edge of the surface outlet and having a radius (R) associated with the first ratio (H/R).

The engine component of any preceding clause wherein the at least one fillet is a hood fillet extending between the slot sidewalls and the outer surface of the outer wall and having a radius (R) associated with the first ratio (H/R).

The engine component of any preceding clause wherein the hood fillet is located at an upstream edge of the surface outlet.

The engine component of any preceding clause wherein the first cooling passage portion extends between a rear wall and the surface outlet and the intermediate outlet is spaced from the rear wall to define a pocket.

The engine component of any preceding clause, further comprising a rear fillet extending between the slot sidewalls and the rear wall and having a radius (R) associated with the first ratio (H/R).

The engine component of any preceding clause wherein the first cooling passage portion extends between a rear wall and the surface outlet and the rear wall aligns with the intermediate outlet.

The engine component of any preceding clause, further comprising a rear fillet extending between the slot sidewalls and the rear wall and having a radius (R) between $\frac{1}{8}D$ and D.

The engine component of any preceding clause wherein the slot sidewalls define a height (H) and a width of the diffusion slot and the width increases to define an increasing cross-sectional area.

The engine component of any preceding clause wherein a line extending from at least one of the slot sidewalls and the first centerline intersect to form an angle ($\beta$) between −20 degrees and 20 degrees.

The engine component of any preceding clause wherein the first centerline extends in a first direction through the impingement zone and in a second direction different than the first direction toward the surface outlet.

The engine component of any preceding clause wherein the first direction and the second direction differ by at least 10 degrees.

The engine component of any preceding clause wherein the first direction is opposite the second direction.

The engine component of any preceding clause wherein the second cooling passage portion extends along a second centerline perpendicular to the conduit sidewalls.

The engine component of any preceding clause wherein the second cooling passage portion extends along a second centerline angled with respect to the conduit sidewalls.

The engine component of any preceding clause wherein the at least one fillet is multiple fillets defined by both the first ratio (H/R) and the second ratios (D/R).

An engine component for a turbine engine having a working airflow separated into a cooling airflow and a combustion airflow, the engine component comprising: an outer wall defining an interior and having an outer surface over which flows the combustion airflow, the outer surface defining a first side and a second side extending between an upstream edge and a downstream edge and extending between a root and a tip, at least one cooling conduit provided in the interior and having conduit sidewalls; a set of cooling passages formed in the outer wall and fluidly coupling the at least one cooling conduit to the outer surface, at least one of the cooling passages in the set comprising: a first cooling passage portion extending between a rear wall and a surface outlet opening on the surface; a second cooling passage portion, intersecting the first cooling passage portion to define a junction, and having an inlet fluidly coupled to the cooling conduit and an intermediate outlet fluidly connecting the second cooling passage portion to the first cooling passage portion at the junction; an impingement zone formed at the junction of the first cooling passage portion and the second cooling passage portion, with the first cooling passage portion defining an impingement surface facing the intermediate outlet of the second cooling passage portion; a diffusion slot formed in the first cooling passage portion and having slot sidewalls defining a first centerline and at least one of the following: an intermediate fillet connecting the second cooling passage portion to the first cooling passage portion and defining at least a portion of the intermediate outlet; an inlet fillet extending between the second cooling passage portion and the conduit sidewalls and defining at least a portion of the inlet; a rear fillet extending between the slot sidewalls and the rear wall; an outlet fillet extending between the slot sidewalls and the outer surface of the outer wall at a downstream end of the surface outlet and defining at least a portion of the surface outlet; or a hood fillet extending between the slot sidewalls and the outer surface of the outer wall and defining at least a portion of the surface outlet.

What is claimed is:

1. An engine component for a turbine engine having a working airflow separated into a cooling airflow and a combustion airflow, the engine component comprising:
    an outer wall defining an interior and having an outer surface over which flows the combustion airflow, the outer surface defining a first side and a second side extending between an upstream edge and a downstream edge and extending between a root and a tip,
    at least one cooling conduit provided in the interior and having conduit sidewalls;
    a set of cooling passages formed in the outer wall and fluidly coupling the at least one cooling conduit to the outer surface, at least one of the cooling passages in the set comprising:
        a first cooling passage portion having a first cross-sectional area defining a first dimension and having a surface outlet opening on the outer surface;
        a second cooling passage portion having a second cross-sectional area defining a second dimension, the second cooling passage portion intersecting the first cooling passage portion to define a junction, and having an inlet fluidly coupled to the cooling conduit and an intermediate outlet fluidly connecting the second cooling passage portion to the first cooling passage portion at the junction;
        an impingement zone formed at the junction of the first cooling passage portion and the second cooling passage portion, with the first cooling passage portion defining an impingement surface facing the intermediate outlet of the second cooling passage portion;

a diffusion slot formed in the first cooling passage portion and having slot sidewalls defining a first centerline; and at least one fillet located within at least one of the first cooling passage portion or the second cooling passage portion and having a radius defined by a ratio defined as either:

a first ratio equal to the first dimension (H) to the radius (R): (H/R), or a second ratio equal to the second dimension (D) to the radius (R): (D/R);

wherein the first and second ratios are each greater than 1/10 (0.10).

2. The engine component of claim 1 wherein the at least one fillet, is at least one of an inlet fillet or an intermediate fillet with a radius (R) associated with the second ratio (D/R).

3. The engine component of claim 2 wherein the intermediate fillet is located along a downstream edge of the intermediate outlet.

4. The engine component of claim 2 wherein the intermediate fillet defines a perimeter of the intermediate outlet.

5. The engine component of claim 1 wherein the at least one fillet is an outlet fillet defining at least a portion of the surface outlet located at a downstream edge of the surface outlet and having a radius (R) associated with the first ratio (H/R).

6. The engine component of claim 1 wherein the at least one fillet is a hood fillet extending between the slot sidewalls and the outer surface of the outer wall and having a radius (R) associated with the first ratio (H/R).

7. The engine component of claim 6 wherein the hood fillet is located at an upstream edge of the surface outlet.

8. The engine component of claim 1 wherein the first cooling passage portion extends between a rear wall and the surface outlet and the intermediate outlet is spaced from the rear wall to define a pocket.

9. The engine component of claim 8, further comprising a rear fillet extending between the slot sidewalls and the rear wall and having a radius (R) associated with the first ratio (H/R).

10. The engine component of claim 1 wherein the first cooling passage portion extends between a rear wall and the surface outlet and the rear wall aligns with the intermediate outlet.

11. The engine component of claim 10, further comprising a rear fillet extending between the slot sidewalls and the rear wall and having a radius (R) between 1/8D and D.

12. The engine component of claim 1 wherein the slot sidewalls define a height (H) and a width of the diffusion slot and the width increases to define an increasing cross-sectional area.

13. The engine component of claim 12 wherein a line extending from at least one of the slot sidewalls and the first centerline intersect to form an angle ($\beta$) between −20 degrees and 20 degrees.

14. The engine component of claim 1 wherein the first centerline extends in a first direction through the impingement zone and in a second direction different than the first direction toward the surface outlet.

15. The engine component of claim 1 wherein the first direction and the second direction differ by at least 10 degrees.

16. The engine component of claim 1 wherein the first direction is opposite the second direction.

17. The engine component of claim 1 wherein the second cooling passage portion extends along a second centerline perpendicular to the conduit sidewalls.

18. The engine component of claim 1 wherein the second cooling passage portion extends along a second centerline angled with respect to the conduit sidewalls.

19. The engine component of claim 1 wherein the at least one fillet is multiple fillets defined by both the first ratio (H/R) and the second ratios (D/R).

20. An engine component for a turbine engine having a working airflow separated into a cooling airflow and a combustion airflow, the engine component comprising:

an outer wall defining an interior and having an outer surface over which flows the combustion airflow, the outer surface defining a first side and a second side extending between an upstream edge and a downstream edge and extending between a root and a tip, at least one cooling conduit provided in the interior and having conduit sidewalls;

a set of cooling passages formed in the outer wall and fluidly coupling the at least one cooling conduit to the outer surface, at least one of the cooling passages in the set comprising:

a first cooling passage portion extending between a rear wall and a surface outlet opening on the surface;

a second cooling passage portion, intersecting the first cooling passage portion to define a junction, and having an inlet fluidly coupled to the cooling conduit and an intermediate outlet fluidly connecting the second cooling passage portion to the first cooling passage portion at the junction;

an impingement zone formed at the junction of the first cooling passage portion and the second cooling passage portion, with the first cooling passage portion defining an impingement surface facing the intermediate outlet of the second cooling passage portion;

a diffusion slot formed in the first cooling passage portion and having slot sidewalls defining a first centerline and at least one of the following:

an intermediate fillet connecting the second cooling passage portion to the first cooling passage portion and defining at least a portion of the intermediate outlet;

an inlet fillet extending between the second cooling passage portion and the conduit sidewalls and defining at least a portion of the inlet;

a rear fillet extending between the slot sidewalls and the rear wall;

an outlet fillet extending between the slot sidewalls and the outer surface of the outer wall at a downstream end of the surface outlet and defining at least a portion of the surface outlet; or a hood fillet extending between the slot sidewalls and the outer surface of the outer wall and defining at least a portion of the surface outlet.

* * * * *